(12) United States Patent
Shingu et al.

(10) Patent No.: US 6,872,355 B2
(45) Date of Patent: Mar. 29, 2005

(54) ROOF RAIL AND METHOD FOR PRODUCING THE ROOF RAIL

(75) Inventors: Shigeo Shingu, Yokohama (JP); Koujun Yogo, Chigasaki (JP)

(73) Assignee: Asahi Kasei Kogyo Kabushiki Kaisha, Osaka (JP)

(*) Notice: Subject to any disclaimer, the term of this patent is extended or adjusted under 35 U.S.C. 154(b) by 517 days.

(21) Appl. No.: 09/864,369

(22) Filed: May 25, 2001

(65) Prior Publication Data

US 2001/0030212 A1 Oct. 18, 2001

Related U.S. Application Data

(62) Division of application No. 09/330,190, filed on Jun. 11, 1999, now abandoned.

(30) Foreign Application Priority Data

Jun. 11, 1998 (JP) .......................................... P.10-163245

(51) Int. Cl.⁷ ................................................ B29D 22/00
(52) U.S. Cl. ..................... 264/572; 264/318; 264/328.7
(58) Field of Search ................................ 264/572, 318, 264/328.7

(56) References Cited

U.S. PATENT DOCUMENTS

| | | |
|---|---|---|
| 4,370,388 A | 1/1983 | Mito et al. |
| 4,826,898 A | 5/1989 | Hirosawa et al. |
| 5,308,574 A | 5/1994 | Yamazaki et al. |
| 5,371,132 A | 12/1994 | Ebara et al. |
| 5,612,067 A * | 3/1997 | Kurihara et al. ............ 425/533 |
| 5,765,737 A | 6/1998 | Cucheran et al. |

FOREIGN PATENT DOCUMENTS

| | | |
|---|---|---|
| JP | 406073288 | 3/1994 |
| JP | 410129357 | 3/1994 |
| JP | 09030334 | 2/1997 |
| JP | 09109783 | 4/1997 |
| JP | 09142226 | 6/1997 |
| JP | 09175280 | 7/1997 |
| JP | 09183166 | 7/1997 |
| JP | 09-207233 A | 8/1997 |
| JP | 10015981 | 1/1998 |
| JP | 10035366 | 2/1998 |
| JP | 10-129359 A | 5/1998 |
| JP | 10151993 | 6/1998 |
| JP | 10193378 | 7/1998 |

* cited by examiner

*Primary Examiner*—Suzanne E. McDowell
(74) *Attorney, Agent, or Firm*—Birch, Stewart, Kolasch & Birch, LLP

(57) ABSTRACT

A roof rail in which a rail portion and a plurality of leg portions are integrally molded by use of a mold having a fixed or movable dam provided in a mold cavity, and which is formed of a polyamide resin composition containing a polyamide resin having a crystallization temperature of not higher than 210° C. and a glass transition temperature of not higher than 70° C. and glass fiber, wherein the difference in surface gloss between the surface of the rail portion and the surface of the leg portion is not higher than 5, and the difference in surface roughness between the surface of the rail portion and the surface of the leg portion is not larger than 0.5 μm.

8 Claims, 4 Drawing Sheets

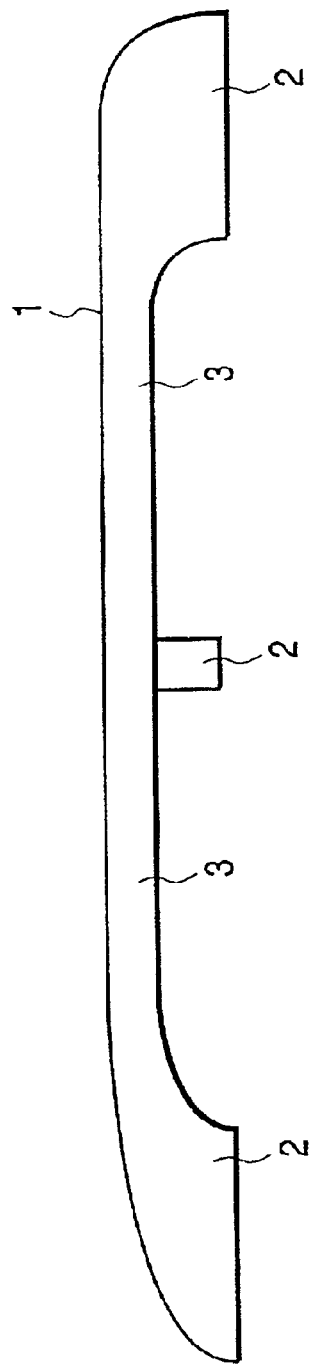
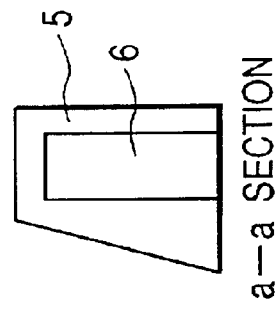
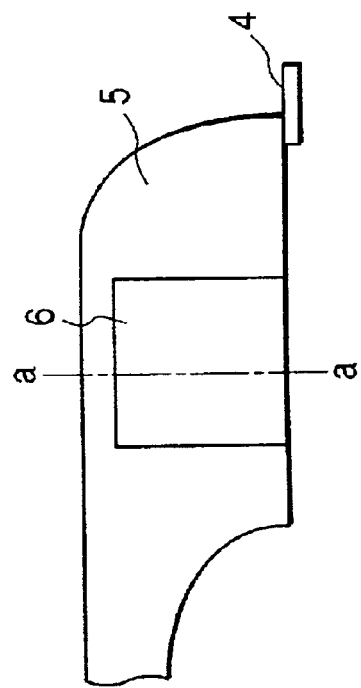

ROOF RAIL AND METHOD FOR PRODUCING THE ROOF RAIL

This application is a divisional of application Ser. No. 09/330,190, filed on Jun. 11, 1999 now abandoned, the entire contents of which are hereby incorporated by reference and for which priority is claimed under 35 U.S.C. § 120; and this application claims priority of Application No. 10-163245 filed in Japan on Jun. 11, 1998 under 35 U.S.C. § 119.

BACKGROUND OF INVENTION

1. Field of the Invention

Vehicle roof rails are mounted onto a roof of a vehicle for the purpose of putting a load on the roof rails.

2. Description of the Related Art

Generally, in a conventional roof rail, a rail portion and leg portions to be mounted onto a roof of a vehicle are provided as separate parts. That is, after the rail portion and the leg portions are produced separately, they are assembled into a roof rail. The roof rail assembled thus is then mounted onto a roof of a vehicle. Further, in the conventional roof rail, the rail portion is constituted by a special-shape metal pipe and each of the leg portions attached to the rail portion is constituted by a metal mold casting or a synthetic resin as disclosed in JP-A-8-2336.

In the conventional roof rail, however, the drawback to the appearance thereof is that a joint is observed in the connection portion between the rail portion and each of the leg portions. Further, being made of a metal, the rail portion is heavy in weight, and has a disadvantage from the points of view of energy saving, improvement in fuel cost, etc. Further, since the rail portion and the leg portions are assembled into a roof rail after they are produced separately, not only special care is required for keeping the strength of the connection portion between the rail portion and each of the leg portions but also the process for production of the roof rail is apt to be complicated so that connection parts are required for connecting the leg portions to the rail portion. Accordingly, there is a heavy burden both on production and on production cost.

To make improvement against the problems in the aforementioned two-parts-type roof rail, a vehicle roof rail of a thermoplastic resin having a rail portion and leg portions integrally molded with the rail portion has already been proposed. Specific examples of the proposed roof rail are described in JP-A-9-109783, JP-A-9-183166, JP-A-9-142226, JP-A-9-175280, JP-A-10-35366, JP-A-9-30334, JP-A-10-15981, JP-A-10-193378, JP-A-10-151993, and the like.

In each of these proposals, there is proposed an integrally-molded vehicle roof rail of a thermoplastic resin reinforced with high-density glass fiber. There is, however, no description of the problem that both external appearance and external surface characteristic of the resulting roof rail might be spoiled remarkably because of appearing in relief of glass fiber, or the like, in the surface. Hence, it is impossible to find any description and any disclosure of an improvement against the problem.

For example, JP-A-9-109783 discloses that mount leg portions and a rail body portion are integrally molded from a glass-fiber-mixed synthetic resin and that a hollow portion is formed in the whole or a part of the rail portion by hollow injection molding. Although JP-A-9-109783 makes a proposal to produce a roof rail in which a joint between the rail portion and each of the mount leg portions is eliminated, there is no description concerning the external appearance of the outer surface of the roof rail.

Further, JP-A-9-183166 makes a proposal concerning the hollow structure of a vehicle roof rail of a synthetic resin having a hollow portion formed by hollow injection molding and concerning a method for forming the hollow. Further, JP-A-9-142226 and JP-A-9-175280 make proposals concerning a vehicle roof rail having a core material buried therein, concerning a method for molding the roof rail and concerning a vehicle roof rail having a member buried therein. In any one of those proposals, there is no description concerning the outer surface and external appearance of the roof rail.

Although JP-A-10-35366 and JP-A-9-30334 also disclose the structure of a vehicle roof rail, a method for producing the roof rail, etc., there is no description concerning the external appearance of the outer surface of the roof rail and a method for molding a roof rail having a good outer surface.

Further, JP-A-10-15981 makes a proposal to form a hollow by hollow injection molding to thereby make improvement against sinking, swelling, etc. caused by shrinking behavior at the time of molding. Further, JP-A-10-193378 makes a proposal to use a specific polyamide resin to thereby suppress an eccentric portion caused by hollow injection molding. In any of the proposals, there is no description concerning the problem of the external appearance of the outer surface caused by appearing in relief of glass fiber, or the like, in the surface.

Although JP-A-10-151993 further proposes the arrangement and the structure of a mold in a hollow injection molding method, there is also no description concerning the problem of the external appearance of the outer surface caused by appearing in relief of glass fiber, or the like, in the surface.

On the other hand, the aforementioned hollow injection molding method using means for forming a hollow portion has already been put into practice as a hollow injection molding method generally as disclosed in JP-A-57-14968. Further, an apparatus and a pressurized gas injection nozzle used in molding have already been disclosed in JP-A-5-177668 filed by the applicant of the present invention, or the like.

As will be understood, for example, from the disclosure of a roof rail of Nylon 66 containing 53% by weight of glass fiber in Embodiment 1 in JP-A-9-109783, a thermoplastic resin reinforced with a large loading weight of glass fiber, or the like, is used in the conventional vehicle roof rail of resin.

When such a reinforced thermoplastic resin filled with high-density glass fiber, or the like, is used, however, glass fiber, or the like, is apt to come to the surface, especially, the outer surface of the resulting roof rail to thereby spoil the surface characteristic of the roof rail. The roof rail having spoiled surface characteristic and spoiled external appearance characteristic after molding lacks its dignity as a whole. Accordingly, it is difficult to satisfy high-grade external appearance performance necessary for an exterior member of a vehicle before or after painting. In the case where the conventional vehicle roof rail is molded, particularly when it is molded by the hollow injection molding method, there is a risk of remarkable surface degradation in the external appearance of the roof rail.

SUMMARY OF THE INVENTION

The present invention is intended to provide a roof rail in which the aforementioned problem in the conventional vehicle roof rail is solved. That is, an object of the present invention is to provide a vehicle roof rail which is excellent both in its surface characteristic and in its external appearance characteristic and is high in quality as a whole so as to be able to be produced as a non-painted product.

To achieve the foregoing object of the present invention, the inventors have observed, in detail, phenomena, such as glass fibers or inorganic fillers appearing in relief in the surface of a molded product, etc., occurring in molding. As a result, it has been found that the behavior of molten resin observed in a portion of the molded product near a resin gate is delicately different from that in a portion of the molded product far from the resin gate.

That is, in the portion near the resin gate, earlier injected molten resin flows while protruding from the resin gate into a mold cavity so as to be shaped like a cord. The earlier injected molten resin is pressed against the wall surface of the mold cavity by molten resin injected later in a stage in which the earlier injected molten resin is more or less cooled. This phenomenon is generally called jetting. The inventors have found that the marks of the thus pressed resin are left in the surface of the molded product to thereby spoil the external appearance of the surface of the molded product.

Thinking that the external appearance of the surface of the molded product could be improved greatly by suppression of such a jetting phenomenon, the inventors conducted various examinations on various countermeasures known as jetting prevention means, for example, adjustment of injection conditions such as injection speed, etc., adjustment of the position, shape, size, etc. of the resin gate, or the like. In the long-sized special-shaped molded product applied to the vehicle roof rail as a subject of the present invention, however, it was impossible to improve the external surface appearance of the resulting molded product sufficiently because also the position of the resin gate allowed to be set in the mold was limited severely.

The inventors further conducted examinations, and as a result, they found the presence of a mold structure which would make it possible to control the flow state of molten resin at the time of injection.

In the long-sized molded product applied to the roof rail, there was further observed a phenomenon which was different from the jetting phenomenon and in which force of pressing molten resin against the cavity surface became insufficient in an end portion of the molded product located far from the resin gate because the end portion was filled with considerably cooled molten resin so that sufficient filling pressure was not transmitted to the end portion. This phenomenon was observed particularly remarkable in the molded product obtained by hollow injection molding. As a result of conduction of various examinations, the inventors found the presence of a mold structure which could allow sufficient pressure to be transmitted to a portion of the molded product far from the resin gate.

Further, the inventors found that the behavior of molten resin at the time of molding varied in accordance with the used resin and that there was some polyamide resin to make it possible to improve the external appearance of the surface of the resulting molded product more greatly.

The inventors conducted further examinations on the basis of the aforementioned findings and found the presence of a surface form to enhance the total quality of the molded roof rail remarkably to thereby make it possible to provide a non-painted product. Thus, the inventors have come to completion of the present invention.

This is, the present invention provides a vehicle roof rail made of a resin composition containing glass fiber, and a polyamide resin having a crystallization temperature of not higher than 210° C. and a glass transition temperature of not higher than 70° C., the roof rail having leg portions to be mounted onto a roof, and a rail portion integrally molded with the leg portions, characterized in that the difference in sixty degrees surface gloss between the surface of the rail portion and the surface of the leg portions is not larger than 5%, and in that the difference in surface roughness between the surface of the rail portion and the surface of the leg portions is not larger than 0.5 $\mu$m.

Further, the present invention provides a method for producing a vehicle roof rail, characterized in that by using a mold having a resin gate, an ejection gate connected to an ejection cavity, and a fixed or movable dam provided in a mold cavity near the resin gate, the mold cavity is filled with a molten polyamide resin composition containing a polyamide resin and glass fiber to mold a rail portion integrally with leg portions to be mounted onto a roof.

Further, in the above method for producing a vehicle roof rail, preferably, while or after the mold cavity is filled with the molten polyamide resin composition, a pressurized gas is injected into the thus packed molten polyamide resin composition through a pressurized gas injection nozzle to eject a surplus of the molten polyamide resin composition from the ejection gate to the ejection cavity having a thickness of not smaller than 10 mm and a width being not smaller than two times of the thickness to thereby form a hollow portion in the inside of the molten polyamide resin composition.

BRIEF DESCRIPTION OF THE DRAWINGS

FIG. 1 is an explanatory view of an example of a roof rail according to the present invention.

FIG. 2 is an explanatory view of a mold structure portion having a dam in the present invention.

FIG. 3 is a sectional view taken along the line a—a' in FIG. 2 which is the explanatory view of the mold.

Each of FIGS. 4A to 4J is an explanatory view of structures of the dam in the present invention.

Figure 4E:
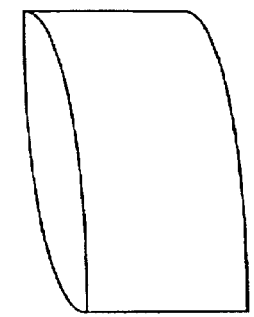
Figure 4D:
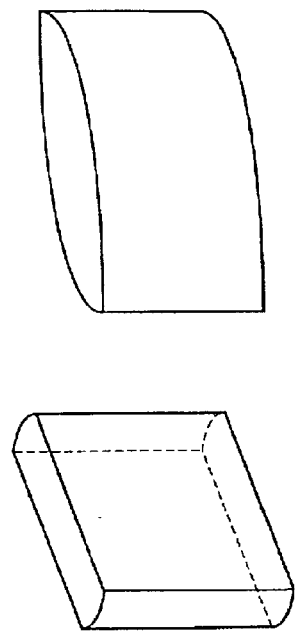
Figure 4C:
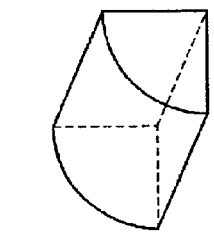
Figure 4B:
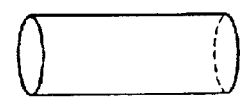
Figure 4A:
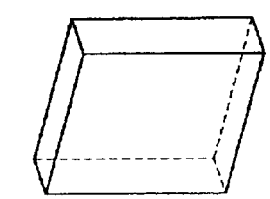
Figure 4J:
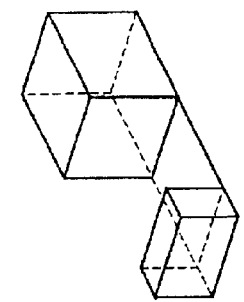
Figure 4I:
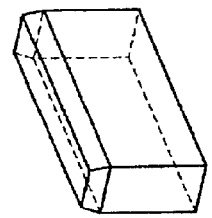
Figure 4H:
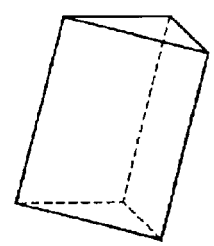
Figure 4G:
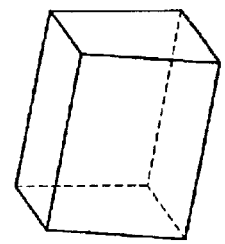
Figure 4F:
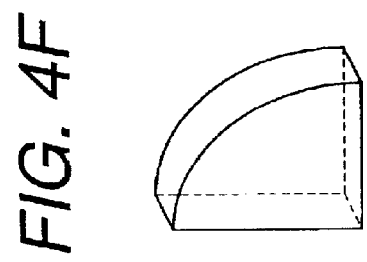
Figure 5:
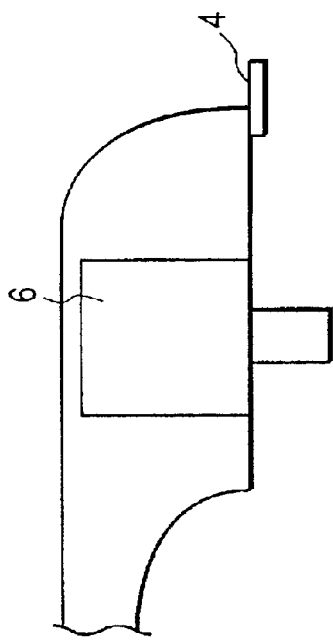

FIG. 5 is an explanatory view of a mold structure in the state where a movable dam in the present invention is protruded into a cavity.

Figure 6:
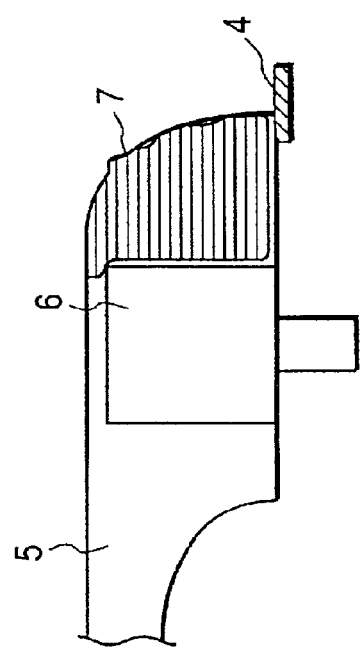

FIG. 6 is an explanatory view of an example of a molding process in the case where a space in a range of from the resin gate to the dam is filled with molten resin in the condition that the movable dam in the present invention is protruded into the cavity.

Figure 7:
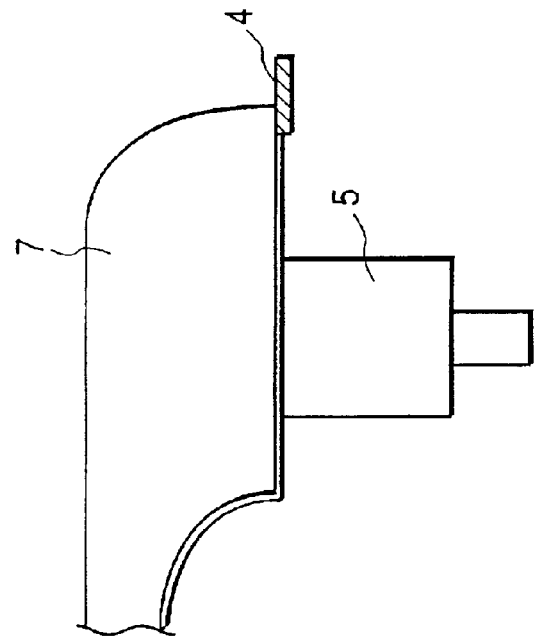

FIG. 7 is an explanatory view of an example of a molding process in the case where the movable dam in the present invention is moved back to a position of the same level as that of the inner surface of the cavity.

Figure 8:
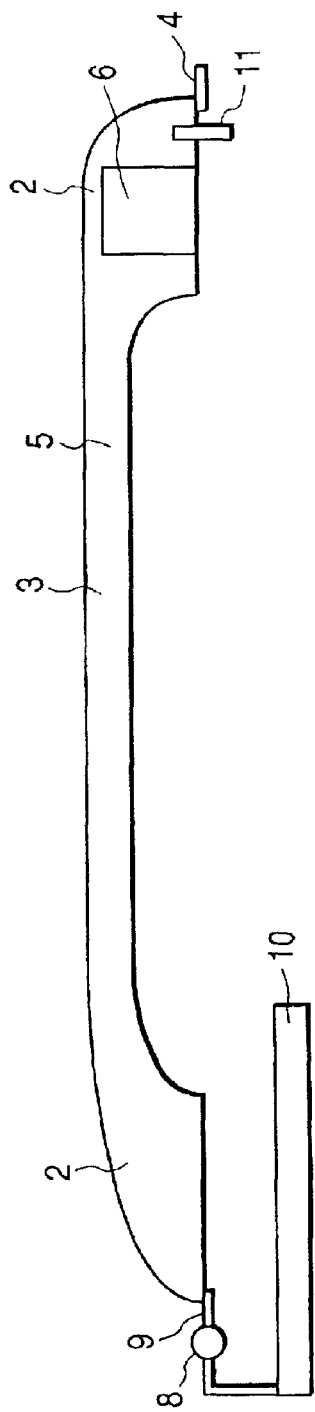

FIG. 8 is an explanatory view of an example of the cavity in a roof rail mold apparatus having a dam, a pressurized gas injection nozzle, an ejection gate and an opening/closing valve in the present invention.

Figure 9:
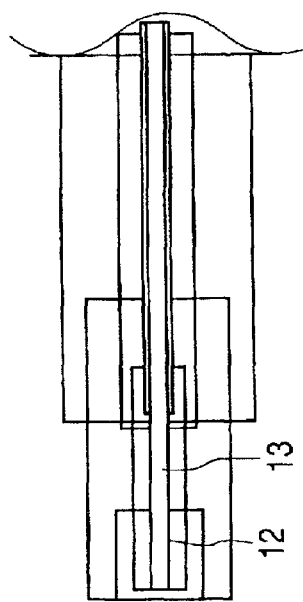

FIG. 9 is an explanatory view of an example of the pressurized gas injection nozzle in a narrow state in the present invention.

Figure 10:
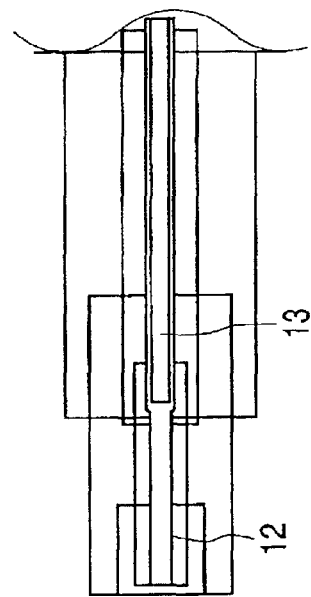

FIG. 10 is an explanatory view of an example of the pressurized gas injection nozzle in a wide state in the present invention.

DETAILED DESCRIPTION OF THE PRESENT INVENTION

The present invention will be described below in detail accompanying with the drawings.

FIG. 1 shows a conceptual view of a vehicle roof rail which is a subject of the present invention. In FIG. 1, the reference numeral 1 designates a roof rail; 2, leg portions of the roof rail; and 3, a rail portion of the roof rail. The roof rail generally has a length corresponding to that of a roof of a vehicle. The whole length of the roof rail is generally not smaller than 100 cm. The leg portions 2 and the rail portion 3 are integrally molded by injection molding.

In the example of the vehicle roof rail shown in FIG. 1, the leg portions 2 are provided in three positions, that is, opposite ends and a center portion of one rail portion 3. In the present invention, however, the number of leg portions 2 may be determined from a loading capacity required for the roof rail and a safety factor based on tolerance limits of assumed dynamic load. The number of leg portions 2 is not limited specifically. The shapes of the leg portions 2 and the shape of the rail portion 3 may be also selected variously.

As described above, the roof rail according to the present invention is formed of a resin composition containing a polyamide resin having a crystallization temperature of not higher than 210° C. and a glass transition temperature of not higher than 70° C., and glass fiber. Further, the roof rail is formed so that the difference in sixty degrees surface gloss between the surface of the rail portion and the surface of the leg portion is not higher than 5% when the surface form of the roof rail is measured in accordance with JIS K-7105 and that the difference in surface roughness Ra therebetween is not larger than 0.5 $\mu$m when the surface form of the roof rail is measured in accordance with JIS B-0601.

The crystallization temperature of the polyamide resin in the present invention is a peak top temperature of a crystallization peak which is measured at a cooling rate of 20° C./min after the polyamide resin is held at a temperature of its melting point plus 20° C. for 5 minutes by use of a DSC. On the other hand, the glass transition temperature is a temperature which is defined as an inflection point on a DSC chart line obtained when a sample prepared by quenching in a dry ice/methanol mixture solution is heated from −20° C. to 150° C. at a heating rate of 20° C./min by use of a DSC.

The roof rail according to the present invention may have a smooth surface or may have an embossed rough surface generally called "grain". Further, the molded roof rail may be painted before use or the roof rail may be used without painting as it is. In the roof rail according to the present invention, it is however necessary to configure the form of the surface of the rail portion and the form of the surface of the leg portion as described above. By the configuration, the external appearance of the rail portion and the external appearance of the leg portion are harmonized and integrated with each other. The total quality of the molded product is improved conspicuously as a whole, so that the roof rail can be produced as a non-painted product. If the roof rail formed so that the difference in surface gloss is higher than 5% and that the difference in surface roughness is larger than 0.5 $\mu$m is used as exterior parts of a car, the parts are inferior in quality to other parts. As a result, there is a risk that the external appearance of the car as a whole may become too bad to fit for use.

If the crystallization temperature of the polyamide resin constituting the roof rail exceeds 210° C., molten resin injected/loaded in the mold cavity is cooled rapidly. As a result, the jetting marks of the injected/loaded molten resin are left slightly in a place near the resin gate. Furthermore, transferring characteristic is worsened in a place far from the resin gate. As a result, both the difference in surface gloss and the difference in surface roughness between the surface of the rail portion and the surface of the leg portion become large in the resulting roof rail. Accordingly, the external appearance of the rail portion and the external appearance of the leg portion are undesirably hardly harmonized with each other. If the glass transition temperature is higher than 70° C., resisting force increases when molten resin is pressed against the cavity wall surface by injection filler pressure. As a result, transferring characteristic is worsened, so that both the difference in surface gloss and the difference in surface roughness become undesirably large.

The roof rail according to the present invention may have a solid portion at least in the rail portion or may have a hollow portion at least in the rail portion.

In the roof rail having a hollow portion according to the present invention, it is particularly preferable that the difference between the largest and smallest values of thickness measured at any ten points of the rail portion in the longitudinal direction of the rail portion and taken in sections perpendicular to the longitudinal direction of the rail portion is not larger than 5 mm. It is further particularly preferable that the hollow ratio of the rail portion is in a range of from 15 to 75% and that the thickness of the rail portion in any section perpendicular to the longitudinal direction of the rail portion is at least 3 mm.

If the difference between the largest and smallest values of thickness in sections at any ten portions of the rail portion in the longitudinal direction of the rail portion is larger than 5 mm, stress is apt to concentrate when a load is put on the roof rail or the roof rail is loaded. As a result, there is a risk that the roof rail may be destroyed easily.

If the hollow ratio is lower than 15%, the roof rail becomes heavy. As a result, there is a risk that the roof rail may become undesirable economically in terms of energy savings and improvement of fuel cost. Furthermore, the volume of the hollow portion in the roof rail is so insufficient that force for pressing molten resin against the wall surface of the mold cavity by the pressure of a pressurized gas at the time of molding is in short supply. As a result, transferring characteristic deteriorates. There is a risk of worsening the external surface appearance.

If the hollow ratio is higher than 75% and the thickness in any section perpendicular to the longitudinal direction of the rail portion is smaller than 3 mm, there is apprehension that strength characteristic, disruptive strength, the quantity of deformation (the quantity of bending), etc. cannot be satisfied sufficiently when a static or dynamic load is assumed at the time of loading, for example, as prescribed in DIN 75 302 (ROOFRACKS FOR PASSENGER CARS Safety Requirements and Testing).

The roof rail according to the present invention is formed of a resin composition containing a polyamide resin having a crystallization temperature of not higher than 210° C. and a glass transition temperature of not higher than 70° C., and glass fiber. Any one of aliphatic polyamide resins, aromatic polyamide resins, denatured polyamide resins, polymeric polyamide resins or blended polyamide resins thereof may be used as the polyamide resin so long as the polyamide resin can satisfy the aforementioned requirements. Of them, it is preferable to use a polyamide resin composed of two units, namely, hexamethylene adipamide unit and hexamethylene phthalamide unit, as disclosed in JP-A-6-73288 filed by the applicant of the present invention. A polyamide resin composed of two units, namely, hexamethylene adipamide unit and hexamethylene phthalamide unit, in which the hexamethylene phthalamide unit is in a range of from 5 to 30% by weight, preferably, from 8 to 30% by weight with respect to the total weight of the polyamide resin and in which sulfuric acid solution viscosity ηr (measured in 100 ml of 95.5% sulfuric acid per 1 g polymer at 25° C.) is in a range of from 1.5 to 3.5, preferably, from 2.0 to 3.0, is used particularly desirably because the roof rail which can achieve the object of the present invention sufficiently can be obtained.

If the hexamethylene phthalamide unit is lower than 5% by weight, there is a risk that both practical performance and external surface appearance of the roof rail may deteriorate because of moisture absorption. If the hexamethylene phthalamide unit is higher than 30% by weight, crystallinity becomes low and the cooling time in molding becomes long so that the production efficiency begins to be reduced. If the sulfuric acid solution viscosity ηr is lower than 1.5, there is a risk of insufficient strength. If the sulfuric acid solution viscosity ηr is higher than 3.5, there is a tendency to worsen molding characteristic at the time of injection molding.

Because the roof rail according to the present invention has good external surface appearance, painting generally carried out to raise the worth of the product can be omitted. Accordingly, the roof rail can be provided inexpensively. When painting is omitted, the deterioration of the polyamide resin caused by light, heat, ultraviolet rays, air (oxygen), water, or the like, can be prevented in the case where the roof rail is used in the outdoor so that the external surface appearance can be kept good for a long time. From this point of view, it is particularly preferable that the polyamide resin contains a copper compound, a phosphite compound, carbon black and a copper phthalocyanine derivative as disclosed in Japanese patent application No. 10-167797 by the applicant of the present invention.

The polyamide resin composition in the present invention contains a polyamide resin and glass fiber and may further contain other inorganic fillers than the glass fiber. More specifically, in the present invention, it is preferable that the polyamide resin composition contains from 35 to 70 parts by weight, preferably from 35 to 65 parts by weight of a polyamide resin, from 30 to 65 parts by weight, preferably from 30 to 60 parts by weight of glass fiber, and from 0 to 35 parts by weight, preferably from 0 to 30 parts by weight of an inorganic filler, in which the total amount of the glass fiber and the inorganic filler is from 30 to 65 parts by weight, preferably from 35 to 65 parts by weight. If the amount of the glass fiber is smaller than 30 parts by weight or the total amount of the glass fiber and the inorganic filler is smaller than 30 parts by weight, there is a tendency to reduce the strength of the roof rail. If the amount of the glass fiber is larger than 65 parts by weight or the total amount of the glass fiber and the inorganic filler is larger than 65 parts by weight, there is apprehension that the external surface appearance of the roof rail may become more inferior.

In the present invention, the kind, fiber diameter and fiber length of the glass fiber, the kind of the inorganic filler, the aspect ratio, etc. are not limited specifically. Further, the glass fiber may be used singly or may be used in combination. When the glass fiber is used in combination with the inorganic filler, it is preferable to use at least one kind of inorganic filler selected from mica, talc, wollastonite, kaoline, magnesium oxide, potassium titanate, calcium carbonate, carbon fiber, and so on.

The resin composition in the present invention may contain a heat stabilizer, a lubricant or a compounding agent, such as a colorant, a weather-resistant agent, or the like, generally used in polyamide resin.

The vehicle roof rail according to the present invention will be described below with reference to the drawings.

FIG. 1 shows a specific example of the aforementioned roof rail according to the present invention. FIG. 2 is a conceptual view showing a mold structure of a portion which is in a mold used for production of the roof rail according to the present invention and which corresponds to a leg portion of the roof rail. In FIG. 2, the reference numeral 4 designates a resin gate; 5, a mold cavity; and 6, a dam.

Referring to FIGS. 1 and 2, a method for producing the roof rail according to the present invention will be described below. A mold having a fixed or movable dam 6 provided in the mold cavity 5 and near the resin gate 4 is used in the present invention. A polyamide resin composition molten is injected by a cylinder of an injection molding apparatus. A jetting-like flow of molten resin poured from the resin gate into the mold cavity is made to collide with the dam 6. In this manner, the flow of molten resin is controlled so that a roof rail is produced.

In the present invention, the resin gate 4 in FIG. 2 is preferably provided in a leg portion 2 constituting the roof rail 1. This is advantageous in that a gate mark is made inconspicuous. Particularly, the resin gate 4 is more preferably provided in either of leg portions at opposite ends.

The dam 6 in the present invention is preferably provided in a position between the resin gate 4 and a portion of shifting from the leg portion 2 to the rail portion 3. More preferably, the dam 6 is set so as to face a main flow of molten resin poured from the resin gate 4 into the mold cavity 5.

The dam 6 may be fixed or movable. Preferably, the size and shape of the dam 6 are designed so that the fluidity of molten resin is not blocked extremely. FIG. 3 shows a section (a–a' section in FIG. 2) of a portion in which the dam is provided, in mold sections perpendicular to the longitudinal direction of the roof rail. As shown in FIG. 3, the size of the dam in the present invention is preferably designed so that the sectional area of the dam is not smaller than 5% of the sectional area of the mold cavity in the position where the dam 6 is provided. If the sectional area of the dam is smaller than 5%, there is a fear that the flow of molten resin is hardly controlled to achieve the object of the present invention.

In the present invention, the form and shape of the dam are not limited. Any one of dams shaped as shown in FIGS. 4A to 4J may be used. Further, the number of dams is not limited specifically.

The dam 6 in the present invention may be one of constituent elements of the mold or may be an element constituting a part of the molded product. In the latter case, the dam 6 may be formed to have a structure using a member buried in the molded product.

When the dam 6 is a movable dam, the following method is preferably employed in the present invention as shown in FIGS. 5 to 7. In the condition that the movable dam 6 is protruded into the mold cavity 5, a polyamide resin composition molten is injected by a cylinder of an injection molding apparatus so that the cavity space between the resin gate 4 and the movable dam 6 is filled with molten resin. Then, the dam 6 is moved back to a position of the same level as that of the wall surface of the cavity, so that the whole space of the mold cavity 5 is filled with the molten polyamide resin successively.

The movable dam in the present invention can be driven, for example, by a pneumatic or hydraulic pump, or the like, connected to the dam. Further, the means for controlling movement of the dam is not limited specifically. For example, the movement of the dam may be controlled on the basis of the time calculated from the volume of a space to the dam 6 inclusive of a sprue, a runner, etc. and the weighing and injection condition of the injection molding apparatus, or the movement of the dam may be controlled on the basis of a pressure-change signal of an inscribed pressure sensor which is provided to detect change of pressure in the cavity.

Further, in the present invention, the injection condition for molding the roof rail, that is, injection temperature, injection pressure, dwell pressure, injection speed, injection time, mold temperature, cooling time, etc., can be selected freely within a range of satisfying the object of the present invention.

The method for producing the roof rail according to the present invention is a method for producing a roof rail having a hollow portion formed by a hollow injection molding method using a mold apparatus shown in FIG. 8.

The mold apparatus shown in FIG. 8 is as follows. A resin gate 4 is provided in a leg portion 2 at an end of the roof rail 1. A fixed or movable dam 6 is provided near the resin gate 4 in the mold cavity 5 so as to face a main flow of molten resin poured from the resin gate 4 into the mold cavity 5. A resin ejection cavity 10 is provided so as to be connected, through a resin ejection gate 9 having a opening/closing valve 8, to a leg portion 2 at the other end of the roof rail 1 which is opposite to the leg portion having the resin gate 4. A pressurized gas injection nozzle 11 is set between the resin gate 4 in the leg portion 2 provided with the resin gate 4 and the fixed or movable dam 6 provided in the mold cavity 5. The pressurized gas injection nozzle 11 includes a not-shown pipe-like sleeve, and a not-shown axial core buried in the sleeve. The pressurized gas injection nozzle 11 has a mechanism to generate a narrow state in a period of from the start of injection of molten resin into the mold cavity to the start of ejection of a pressurized gas injected into molten resin and to generate a wide state in a period of from the start of ejection of the pressurized gas till the mold is opened.

Although FIG. 8 shows a roof rail molding mold apparatus having two leg portions 2, the number and shape of the leg portions are not limited specifically in the present invention.

The resin ejection cavity 10 shown in FIG. 8 is a cavity for receiving a surplus of ejected resin to form a hollow portion in the roof rail. Preferably, the ejection cavity 10 has a thickness of not smaller than 10 mm and a width of not smaller than twice the thickness. The total volume V of the resin ejection cavity 10 is calculated by thickness×width× length. The volume of the resin ejection cavity 10 in the present invention may be provided as fixed volume or as adjustable volume.

The thinner the resin ejection cavity 10 is, the better it is in the case where resin ejected to the resin ejection cavity 10 is pulverized for the purpose of reclamation, or the like. However, if the resin ejection cavity 10 is thinner than 10 mm, a wall-surface flow of resin ejected into the resin ejection cavity 10 and a center-portion flow of molten resin are unbalanced so that bursting caused by the injected pressurized gas is brought at an end of the center-portion flow of molten resin. There is a risk that it is difficult to form a desired hollow portion and to secure uniform hollow and thickness. Furthermore, since the injected pressurized gas leaks out of system by the bursting mentioned above, it is difficult to impose uniform pressure on respective parts of the roof rail. There is a fear that the external surface appearance enough to achieve the object of the present invention can be hardly obtained.

The resin ejection cavity 10 is connected to the mold cavity 5 for forming or corresponding to the roof rail 1 through the resin ejection gate 9 provided with the opening/closing valve 8 driven and controlled by hydraulic or pneumatic pressure. In the present invention, the size and length of the resin ejection gate 9 may be determined suitably.

An example of the pressurized gas injection nozzle 11 is shown in FIGS. 9 and 10. The pressurized gas injection nozzle includes a pipe-like sleeve 12, and an axial core 13 buried in the sleeve 12. FIG. 9 is an explanatory view of the pressurized gas injection nozzle in which the axial core 13 buried in the sleeve is in a narrowed state. FIG. 10 is an explanatory view of the pressurized gas injection nozzle in which the axial core 13 is in a widened state.

The pressurized gas injection nozzle is in a narrow state (FIG. 9) in a period of from the start of injection of molten resin to the mold cavity 5 to the start of ejection of the pressurized gas injected into molten gas. The pressurized gas is collected and ejected through the same path as the path used for injection of the pressurized gas. The pressurized gas injection nozzle is in a wide state (FIG. 10) in a period of from the start of ejection of the pressurized gas till the mold is opened. The pressurized gas injection nozzle in the present invention has a mechanism to generate the narrow state and a mechanism to generate the wide state.

The gap between the pipe-like sleeve 12 and the axial core 13 in the narrow state of the pressurized gas injection nozzle in the present invention is preferably not wider than 0.010 mm concentrically and further preferably not shorter than 10 mm in the longitudinal direction.

A pressurized gas injection nozzle having the aforementioned mechanism has been already proposed in JP-A-5-177668 by the applicant of the present invention. In the proposal, there is a disclosure that the gap between the pipe-like sleeve and the axial core buried in the sleeve in the narrow state is in a range of from 0.02 to 0.2 mm. In the inventors' examination, however, when the pressurized gas injection nozzle having such a large gap was used, there was observed a phenomenon in which molten polyamide resin injected under a high pressure entered into the gap between the sleeve and the axial core and blocked the pressurized gas injection circuit in the case where molten resin was injected/ loaded under a high pressure and at a high speed.

If the gap between the pipe-like sleeve 12 and the axial core 13 buried in the sleeve in the narrow stare of the pressurized gas injection nozzle is wider than 0.010 mm concentrically and shorter than 10 mm as a narrow-state length in the longitudinal direction, molten polyamide resin injected under a high pressure enters into the gap between the sleeve and the axial core and blocks the pressurized gas injection circuit, like the aforementioned observation result. As a result, there is a fear that the molten resin injection condition is limited. Furthermore, transferring of resin to the mold surface at the time of resin-injection becomes insufficient. Accordingly, there is also a fear that the external appearance of the surface of the roof rail worsens. In consideration of blowing-out of the pressurized gas, frictional characteristic, etc., the gap between the sleeve and the axial core is preferably set to be not wider than 0.010 mm concentrically and not shorter than 10 mm as a narrow-state length in the longitudinal direction.

In the pressurized gas injection nozzle 11, a pressurized gas outlet for injecting the pressurized gas into molten resin is preferably buried in the inside of the leg portion 2 by at least 10 mm from a roof-contact surface of the leg portion 2 provided with the resin gate 4 in the mold cavity, more preferably, buried up to a line of extension of the axial center of the rail portion 3.

If the substantial pressurized gas outlet of the pressurized gas injection nozzle 11 buried in the inside of the leg portion 2 is shorter than 10 mm, not only the thickness of the hollow portion in a neighbor of the pressurized gas injection portion becomes so small that strength is hardly secured but also the injected pressurized gas leaks to the mold cavity wall surface so that it cannot be injected efficiently to make the formation of the hollow unstable. As a result, there is a fear that the external appearance of the surface of the obtained roof rail is worsened.

Although the example of the mold apparatus shown in FIG. 8 shows the case where the pressurized gas injection nozzle 11 is set in the middle between the resin gate 4 and the dam 6, the setting position of the nozzle 11 can be preferably selected to be a desired position in the leg portion 2 provided with the resin gate without departing from the object of the present invention. It is more preferable from the point of view of easier formation of the hollow that the pressurized gas injection nozzle 11 is set in the middle between the resin gate 4 and the dam 6.

An embodiment of the present invention as to a method for molding a roof rail having a hollow portion will be described below by way of example.

The hollow injection molding method in the present invention is known, for example, in JP-B-57-14968 by the applicant of the present invention, or the like. The method is a so-called hollow injection molding method in which a pressurized gas is injected into molten resin with which the mold cavity is filled.

In the present invention, as described above, the mold apparatus shown in FIG. 8 is used so that molding is made as follows. That is, in the condition that the pressurized gas injection nozzle 11 is in a narrow state and the opening/closing valve 8 on the resin ejection gate 9 is closed, molten resin is injected into the mold cavity 5 by an injection molding apparatus so that the cavity 5 is filled with an amount of molten resin enough to fill the cavity 5. At the same time or after the cavity 5 is filled with molten resin, 50 kg/cm$^2$ to 300 kg/cm$^2$ of a pressurized gas of inert gas represented by high-pressure nitrogen gas produced by a high-pressurized gas producing unit is injected from the pressurized gas injection nozzle 11 into molten gas with which the cavity 5 is filled. At the same time or after the pressurized gas is injected, the opening/closing valve 8 on the resin ejection gate 9 is opened so that an amount of molten resin necessary for forming a hollow portion at a hollow ratio in a range of from 15 to 75% is ejected into the resin ejection cavity 10. Then, injecting the pressurized gas, keeping the high-pressure state by the pressurized gas and cooling are performed for a predetermined time. Then, the axial core 13 buried in the sleeve 12 of the pressurized gas injection nozzle 11 is moved back and the pressurized gas injection nozzle is turned to a widened state so that the pressurized gas injected into molten resin is ejected from the roof rail molded product solidified in the cavity. Then, the mold is opened so that the roof rail molded product is taken out from the mold.

In the present invention, the dam 6 in the mold cavity 5 may be provided as a movable dam. In this case, the present invention can be carried out by the same method as the aforementioned molding method except the point as follows. Molten resin is injected in the condition that the dam 6 protrudes into the space of the cavity 5 which is not injected/loaded with molten resin yet. After the space of the cavity 5 in a range of from the resin gate 4 to the dam 6 is filled with molten resin in this manner, the dam 6 is moved back to a position of the same level as that of the inner surface of the cavity 5 so that molten resin is injected/loaded into the cavity 5 successively.

The aforementioned embodiment for molding a roof rail having a hollow portion formed by hollow injection molding is usually classified as a full-shot method in terms of the quantity of molten resin to fill the mold cavity and a cavity injection method in terms of injection of the pressurized gas. Although this method is a desirable method to obtain a roof rail having a desired hollow portion and a good external surface appearance as described above, other methods, such as a short-shot method classified in terms of the quantity of molten resin and a nozzle injection method and a runner injection method classified in terms of injection of the pressurized gas, may be selected within a range satisfying the object of the present invention.

In the present invention, injection conditions, such as injection temperature, injection pressure, dwell pressure, injection speed, injection time, mold temperature, cooling time, pressurized gas injection time, pressurized gas holding time, pressurized gas collection and ejection time, etc., for molding a roof rail can be selected suitably within a range satisfying the object of the present invention.

In the present invention, molten resin is preferably injected/loaded into the mold cavity at a rate of 200 cc/sec or more so that the bulk quantity of resin at its melting temperature is not smaller than the volume of the mold cavity. In some case, a resin dwell-pressure process used in general injection molding may be preferably added and the opening of the opening/closing valve on the ejection gate may be preferably performed when or after filling the mold cavity with molten resin is completed.

EXAMPLES

Although the present invention will be described below specifically on the basis of examples, the invention is not limited to the examples.

Incidentally, the roof rails obtained in the following examples and comparative examples were evaluated as follows.

(1) Method for Evaluation of Surface State by Eye Observation

The surface state of the roof rail molded product obtained was evaluated by eye observation on the basis of the following criterion.

A: The outer surface of the roof rail is very smooth.
B: The outer surface of the roof rail is smooth.
C: A relief-like pattern of glass fiber is observed in the outer surface of the roof rail.
D: A large number of relief-like patterns of glass fiber are observed in the outer surface of the roof rail.

(2) Averaged Surface Gloss

This is an average of values obtained when the sixty degrees surface gloss of a 3 cm×7 cm surface area was measured at ten points taken at regular intervals in the longitudinal direction of the obtained roof rail molded product, in accordance with JIS K 7105 by use of a handy glossmeter IG302 made by Horiba Ltd.

(3) Surface Gloss Difference

This is the difference in surface gloss between the largest and smallest values of the sixty degrees surface gloss obtained at the ten points.

(4) Averaged Surface Roughness

This is an average of values obtained when the surface roughness Ra of a 3 cm×7 cm surface area was measured at ten points taken at regular intervals in the longitudinal direction of the obtained roof rail molded product, in accordance with JIS B 0601 by use of a three-dimensional surface roughness geometrical measurer 570A made by Tokyo Seimitsu Co., Ltd.

(5) Surface Roughness Difference

This is the difference in surface roughness Ra between the largest and smallest values of the values of surface roughness Ra obtained at the ten points.

(6) Method for Evaluation of Presence/absence of Jetting Pattern by Eye Observation The surface state of the obtained roof rail molded product was evaluated by eye observation on the basis of the following criterion.

A: The outer surface of the roof rail is so very smooth as to be free from any jetting pattern.
B: The outer surface of the roof rail is so smooth as to be free from any jetting pattern.
C: A jetting-mark pattern is observed in the outer surface of the roof rail.
D: A large number of jetting-mark patterns are observed in the outer surface of the roof rail.

(7) Averaged Thickness of Hollow Portion

This is an average of ten smallest thickness values obtained when thickness was measured in sections which were taken at ten equal-interval points in the longitudinal direction of the obtained roof rail molded product so as to be perpendicular to the longitudinal direction, by use of a 1/100 mm micrometer.

(8) Difference in Averaged Thickness of Hollow Portion

This is the difference between the largest and smallest thickness values in the hollow portion measured at the ten points.

(9) Hollow Ratio

The weight of resin ejected into the ejection cavity was divided by the sum of the weight of resin ejected into the ejection cavity and the weight of the roof rail molded product. The thus obtained value was multiplied by 100. The thus obtained value was made hollow ratio.

Results of evaluation of polyamide resin compositions used in the following examples and comparative examples were collectively shown in Table 1. Molding conditions for molding a roof rail by use of various polyamide resin shown in Table 1 were collectively shown in Table 2. Results of evaluation of roof rails molded by the molding conditions shown in Table 2 were collectively shown in Table 3.

Example 1

Polyamide composed of two units, namely, hexamethylene adipamide unit (Ny66) and hexamethylene phthalamide unit (Ny61), in which the weight ratio of Ny66 to Ny61 was 85/15 and ηr was 2.40, was used as the polyamide resin. Fifty parts by weight of glass fiber were mixed with 50 parts by weight of the polyamide resin so that a polyamide resin composition were prepared. In this example, a roof rail molding mold apparatus having a planished cavity surface and having a whole length of 1600 mm as shown in FIG. 8 was used. A solid roof rail was molded in the condition that the opening/closing valve on the ejection gate was closed. An injection molding apparatus having a clamping force of 900 tons was used for molding under the molding conditions of cylinder temperature of 285° C., mold temperature of 900° C., injection filling time of 4.5 sec, resin dwelling of 40% and cooling time of 90 sec. The molded roof rail was evaluated by eye observation. As a result, no jetting mark was observed both in the surface of the rail portion and in the surface of the leg portion, so that the roof rail having a sense of high quality as a whole was obtained. The surface gloss and surface roughness of the surface of the roof rail molded product were measured in positions taken at regular intervals of about 145 mm on the whole length of the roof rail molded product. As a result, the averaged surface gloss and averaged surface roughness Ra on the whole of the roof rail were 55% and 0.6 μm respectively. The difference in surface gloss between the rail portion and the leg portion was 2%. The difference in surface roughness Ra between the rail portion and the leg portion was 0.2 μm.

Incidentally, in the polyamide resin used in this example, the crystallization temperature and glass transition temperature measured with a DSC were 205° C. and 53° C. respectively.

The proportion of the polyamide resin composition and the result of measurement of the polyamide resin as described above were shown in Table 1. Further, the molding conditions and the result of evaluation of the roof rail as a molded product were collectively shown in Tables 2 and 3 respectively.

Example 2

The same polyamide resin and the same mold apparatus as in Example 1 were used. A roof rail having a hollow portion was molded by hollow injection molding under the molding conditions shown in Table 2. The surface of the roof rail thus obtained was evaluated by eye observation. As a result, no jetting mark was observed in respective parts of the roof rail, so that the roof rail having a sense of high quality as a whole was obtained. Further, surface gloss and surface roughness were measured in the same manner as in Example 1. Further, thickness values measured in the same position as in Example 1 were not smaller than 3 mm, so that relatively uniform thickness was obtained. Results of evaluation were shown in Table 3.

Example 3

Polyamide composed of two units, namely, hexamethylene adipamide unit (Ny66) and hexamethylene phthalamide unit (Ny61), in which the weight ratio of Ny66 to Ny61 was 80/20 and ηr was 2.60, was used as the polyamide resin. Fifty five parts by weight of glass fiber and 5 parts by weight of an inorganic filler (kaoline) were mixed with 40 parts by weight of the polyamide resin so that a polyamide resin was prepared. The same roof rail molding mold apparatus as that used in Example 1 as shown in FIG. 8 were used. A solid roof rail was molded in the same manner as in Example 1 under the molding conditions shown in Table 2. The surface of the roof rail thus obtained was evaluated by eye observation. As a result, no jetting mark was observed in the surfaces of respective parts of the roof rail, so that the roof rail having a sense of high quality as a whole was obtained. Further, surface gloss and surface roughness of the surface of the roof rail were measured in the same manner as in Example 1. Results of evaluation were collectively shown in Table 3.

Incidentally, in the polyamide resin used in this example, the crystallization temperature and glass transition temperature measured with a DSC were 195° C. and 56° C. respectively. Results of measurement were shown in Table 1.

Example 4

The same polyamide resin and the same mold apparatus as in Example 3 were used. A roof rail having a hollow portion was obtained by hollow injection molding under the molding conditions shown in Table 2. The surface of the roof rail thus molded was evaluated by eye observation. As a result, no jetting mark was observed in the surfaces of respective parts of the roof rail, so that the roof rail having a sense of high quality as a whole was obtained. Further, surface gloss and surface roughness of the roof rail were measured in the same manner as in Example 1. Results of measurement were collectively shown in Table 3. Further, thickness values measured in the same position as in Example 1 were not smaller than 3 mm, so that relatively uniform thickness was obtained. Results of evaluation were shown in Table 3.

Example 5

The same roof rail molding mold apparatus and the same polyamide resin composition as in Example 1 were used. A roof rail having a hollow portion was obtained by hollow injection molding under the molding conditions shown in Table 2 except that the dam was provided as a movable dam. The surface of the roof rail thus molded was evaluated by eye observation. As a result, no jetting mark was observed in respective parts of the roof rail, so that the roof rail having a sense of high quality as a whole was obtained. Further, surface gloss and surface roughness of the roof rail were measured in the same manner as in Example 1. Further, thickness values measured in the same position as in Example 1 were not smaller than 3 mm, so that relatively uniform thickness was obtained. Results of evaluation were shown in Table 3.

Incidentally, the time required for filling the volume of the mold cavity with molten resin in a range of from the gate to the dam was calculated on the basis of relations among the measured value of injection, the actual filling time and the volume of the space of the mold cavity to the dam. A hydraulic cylinder was operated on the basis of a timer to thereby move the movable dam.

Comparative Example 1

Polyamide composed of two units, namely, hexamethylene adipamide unit (Ny66) and hexamethylene phthalamide unit (Ny61), in which the weight ratio of Ny66 to Ny61 was 90/10 and ηr was 2.35, was used as the polyamide resin. Fifty five parts by weight of glass fiber were mixed with 45 parts by weight of the polyamide resin so that a polyamide resin was prepared. The same roof rail molding mold apparatus as that used in Example 2 was used. A roof rail having a hollow portion was molded by hollow injection molding under the molding conditions shown in Table 2 without use of any dam. The surface of the roof rail thus obtained was evaluated by eye observation. As a result, some jetting-mark patterns were observed in the surface of the roof rail. Further, surface gloss and surface roughness were measured in the same manner as in Example 2. Further, thickness values were measured in the same positions as in Example 2. Results of evaluation were collectively shown in Table 3.

Incidentally, in the polyamide resin used in this comparative example, the crystallization temperature and glass transition temperature measured with a DSC were 208° C. and 50° C. respectively.

Comparative Example 2

A polyamide resin in which 50 parts by weight of glass fiber was mixed with 50 parts by weight of polyamide 66 resin was used as the polyamide resin. The same roof rail molding mold apparatus as that used in Example 2 was used. A roof rail having a hollow portion was molded by hollow injection molding under the molding conditions shown in Table 2. The surface of the roof rail thus obtained was evaluated by eye observation. As a result, some jetting-mark patterns were observed in the surface of the roof rail. Further, surface gloss and surface roughness were measured in the same manner as in Example 2. Further, thickness values were measured in the same positions as in Example 2. Results of evaluation were collectively shown in Table 3.

Incidentally, in the polyamide resin used in this comparative example, the crystallization temperature and glass transition temperature measured with a DSC were 225° C. and 45° C. respectively.

Comparative Example 3

A polyamide resin in which 50 parts by weight of polyamide MXD6 was mixed with 50 parts by weight of polyamide 66 resin was used as the polyamide resin. The same roof rail molding mold apparatus as that used in Example 2 was used. A roof rail having a hollow portion was molded by hollow injection molding under the molding conditions shown in Table 2. The surface of the roof rail thus obtained was evaluated by eye observation. As a result, some jetting-mark patterns were observed in the surface of the roof rail. Further, surface gloss and surface roughness were measured in the same manner as in Example 2. Further, thickness values were measured in the same positions as in Example 2. Results of evaluation were collectively shown in Table 3.

Incidentally, in the polyamide resin used in this comparative example, the crystallization temperature and glass transition temperature measured with a DSC were 200° C. and 79° C. respectively.

Comparative Example 4

The same polyamide resin and the same mold apparatus as in Example 2 were used except that the thickness of the resin ejection cavity was 8 mm. A roof rail having a hollow portion was molded by hollow injection molding under the molding conditions shown in Table 2. However, an end of a flow of molten resin ejected into the resin ejection cavity burst by the injected pressurized gas, so that the formation of the hollow was insufficient. Further, the external appearance of the end portion of the roof rail molded product thus obtained was very poor.

Comparative Example 5

The same polyamide resin and the same mold apparatus as in Example 2 were used. A roof rail having a hollow portion was molded by hollow injection molding under the molding conditions shown in Table 2 except that the gap between the sleeve and the axial core of the pressurized gas injection nozzle was set to be 50 μm in the narrow state. However, when molding was performed continuously, the state of the hollow portion of the molded product became unstable and the state of the surface became poor. Further, the release of the injected pressurized gas from the roof rail molded product became insufficient so that bursting of the molded product occurred when the mold was opened to take out the molded product.

TABLE 1

|  | Example 1 | Example 2 | Example 3 | Example 4 | Example 5 | Comparative Example 1 | Comparative Example 2 | Comparative Example 3 |
|---|---|---|---|---|---|---|---|---|
| Polyamide Type | 66/6I | 66/6I | 66/6I | 66/6I | 66/6I | 66/6I | 66 | MXD6 |
| 6I (part by wt.) | 15 | 15 | 20 | 20 | 15 | 10 | — | — |
| GF (Part by wt.) | 50 | 50 | 55 | 55 | 50 | 55 | 50 | 50 |
| Inorganic Filler (Part by wt.) | — | — | 5 | 5 | — | — | — | — |
| Solution Viscosity ($\eta r$) | 2.40 | 2.40 | 2.60 | 2.60 | 2.40 | 2.35 | — | — |
| Crystallization Temp. (° C.) | 205 | 205 | 195 | 195 | 205 | 208 | 225 | 200 |
| Glass Transition Temp. (° C.) | 53 | 53 | 56 | 56 | 53 | 50 | 45 | 79 |

TABLE 2

|  | Example 1 | Example 2 | Example 3 | Example 4 | Example 5 | Comparative Example 1 | Comparative Example 2 | Comparative Example 3 |
|---|---|---|---|---|---|---|---|---|
| Gate Position | Rear Leg | Rear Leg | Rear Leg | Rear Leg | Rear Leg | Rear Leg | Rear Leg | Rear Leg |
| Dam Type | Fixed | Fixed | Fixed | Fixed | Movable | None | Fixed | Fixed |
| Dam Own Area (%) | 50 | 50 | 50 | 50 | 40 | — | 50 | 50 |
| Ejection Cavity Width (mm) | — | 60 | — | 60 | 60 | 60 | 60 | 60 |
| Ejection Cavity Thickness (mm) | — | 18 | — | 18 | 18 | 18 | 18 | 18 |
| Gas Injection Nozzle | Not Used | Used | Not Used | Used | Used | Used | Used | Used |
| Gas Injection Nozzle Gap ($\mu$m) | — | 10 | — | 10 | 10 | 10 | 10 | 10 |
| Injection Molder (Clamping Forceton) | 900 | 900 | 900 | 900 | 900 | 900 | 900 | 900 |
| Cylinder Temp. (° C.) | 285 | 285 | 285 | 285 | 295 | 285 | 285 | 300 |
| Mold Temp. (° C.) | 90 | 90 | 90 | 90 | 90 | 90 | 90 | 120 |
| Injection fill-up Time (sec.) | 4.5 | 4.5 | 5.1 | 5.1 | 5.3 | 4.5 | 4.5 | 4.5 |
| Dwell (%) | 40 | None | 40 | None | None | None | None | None |
| Cooling Time (sec) | 90 | 90 | 90 | 90 | 75 | 90 | 90 | 90 |
| Injection Gas Pressure (cm/cm$^2$) | — | 200 | — | 200 | 200 | 200 | 200 | 200 |
| Pressure Gas Injection Delay Time (sec) | — | 0.5 | — | 0.5 | 0.5 | 0.5 | 0.5 | 0.5 |
| Pressure Gas Injection Time (Sec) | — | 30 | — | 30 | 30 | 30 | 30 | 30 |
| Pressure Gas Dwell Time (sec) | — | 40 | — | 40 | 40 | 40 | 40 | 40 |
| Ejection Cavity Opening Delay Time (Sec) | — | 0.5 | — | 0.5 | 0.5 | 0.5 | 0.5 | 0.5 |

TABLE 3

|  | Example 1 | Example 2 | Example 3 | Example 4 | Example 5 | Comparative Example 1 | Comparative Example 2 | Comparative Example 3 |
|---|---|---|---|---|---|---|---|---|
| Surface State (Eye Observation) | A | A–B | A | A–B | A–B | B–C | D | D |
| Surface Gloss Average (%) | 55 | 51 | 58 | 54 | 49 | 47 | 23 | 23 |
| Surface Gloss Difference (%) | 2 | 5 | 3 | 4 | 5 | 7 | 12 | 9 |
| Surface Roughness Ra Average ($\mu$m) | 0.6 | 0.8 | 0.5 | 0.7 | 0.9 | 1.1 | 3.5 | 2.8 |
| Surface Roughness Ra Difference ($\mu$m) | 0.2 | 0.4 | 0.2 | 0.3 | 0.5 | 0.7 | 1.2 | 1.0 |
| Jetting (Eye Observation) | A | A | A | A | A | B–C | C–D | C–D |

TABLE 3-continued

|  | Example 1 | Example 2 | Example 3 | Example 4 | Example 5 | Comparative Example 1 | Comparative Example 2 | Comparative Example 3 |
|---|---|---|---|---|---|---|---|---|
| Thickness of Hollow Portion Average (mm) | — | 4.8 | — | 4.6 | 5.1 | 4.5 | 5.7 | 5.3 |
| Thickness of Hollow Portion Difference (mm) | — | 3.0 | — | 2.8 | 3.9 | 2.9 | 6.5 | 7.2 |
| Hollow Rate (%) | — | 29 | — | 31 | 28 | 28 | 23 | 25 |

The present invention configured as described above in detail has the following remarkable effects.

1. Because the vehicle roof rail according to the present invention is formed of a polyamide resin composition reinforced with glass fiber and inorganic filler, the roof rail is strong and particularly excellent in durability against bending stress loading at the time of loading.
2. Further, since the leg portion and the rail portion are integrally molded, the roof rail has an excellent jointless appearance.
3. Further, because the roof rail is formed so that the difference in surface form between the leg portion and the rail portion becomes very small, the quality of the roof rail as a whole is so high that the external surface appearance of both the leg portion and the rail portion is improved greatly compared with the conventional resin roof rail.
4. Accordingly, the roof rail can be produced as a non-painted product.
5. Accordingly, the roof rail having high quality and excellent external surface appearance can be provided inexpensively.
6. Because, in the method for producing a roof rail according to the present invention, the roof rail can be molded while a flow of molten resin at the time of molding is controlled, the phenomenon of spoiling the external surface appearance of the molded product, such as a jetting phenomenon, or the like, can be reduced greatly.
7. Accordingly, the yield of roof rail molded products can be improved greatly, so that the quantity of the polyamide resin composition required for molding and the cost of molding can be reduced greatly.
8. Since a specific polyamide resin fulfilling mechanical characteristic peculiar to polyamide and being excellent in moldability is used in the present invention, molding can be performed while a flow of molten resin is controlled even in the case where a composition containing a large amount of glass fiber and a large amount of inorganic filler is used as the resin.

What is claims is:

1. A method of producing a vehicle roof rail by using a mold having a resin gate, an ejection gate connected to an ejection cavity, and a dam provided in a mold cavity near said resin gate, said method comprising:

filling said mold cavity with a molten polyamide resin composition containing a polyamide resin and glass fiber, and said polyamide resin has a crystallization temperature of not higher than 210° C. and a glass transition temperature of not higher than 70° C.; and molding a rail portion integrally with leg portions to be mounted onto a roof.

2. The method of producing a vehicle roof rail according to claim 1 comprising:

protruding said dam used as a movable dam into said mold cavity;

filling a space of from said resin gate to said dam with said molten polyamide resin composition; and moving said dam back from said die cavity to fill the whole space of said mold cavity with said molten polyamide resin composition.

3. The method of producing a roof rail according to claim 2 comprising:

injecting a pressurized gas into the thus packed molten polyamide resin composition through a pressurized gas injection nozzle while or after said mold cavity is filled with said molten polyamide resin composition; and ejecting a surplus of said molten polyamide resin composition from said ejection gate to said ejection cavity having a thickness of not smaller than 10 mm and a width being twice as large as the thickness to thereby form a hollow portion in the inside of said molten polyamide resin composition.

4. The method of producing a roof rail according to claim 3, wherein said pressurized gas injection nozzle has a pipe-like sleeve, and an axial core buried in said sleeve, and in that the gap between said pipe-like sleeve and said axial core in a narrowed state of said nozzle is not wider than 0.010 mm in a section perpendicular to a longitudinal direction of said sleeve and is not shorter than 10 mm in the longitudinal direction of said sleeve.

5. The method of producing a roof rail according to claim 1, wherein said polyamide resin contains a hexamethylene adipamide unit and a hexamethylene phthalamide unit.

6. The method of producing a roof rail according to claim 1, wherein a copper compound, a phosphite compound, carbon black and a copper phthalocyanine derivative are mixed with said polyamide resin.

7. The method or producing a roof rail according to claim 1, wherein said resin composition contains a polyamide resin in a range of from 35 to 75 parts by weight, glass fiber in a range of from 50 to 65 parts by weight, and an inorganic filler in a range of from 0 to 35 parts by weight, and in that the total amount of said glass fibers and said inorganic filler is in a range of from 30 to 65 parts by weight.

8. The method producing a roof rail according to claim 1, wherein said dam is movable.

* * * * *